(12) United States Patent
Irikura et al.

(10) Patent No.: US 7,493,998 B2
(45) Date of Patent: Feb. 24, 2009

(54) AUTOMATIC TRACTION ENHANCEMENT FOR TRANSAXLE

(75) Inventors: Koji Irikura, Morristown, TN (US); Donald Wieber, Bean Station, TN (US)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 248 days.

(21) Appl. No.: 11/090,097

(22) Filed: Mar. 28, 2005

(65) Prior Publication Data

US 2006/0213741 A1    Sep. 28, 2006

(51) Int. Cl.
F16D 41/067    (2006.01)
F16H 48/16    (2006.01)

(52) U.S. Cl. .............................. 192/38; 192/50; 74/650

(58) Field of Classification Search .................. 192/44, 192/50; 74/650
See application file for complete search history.

(56) References Cited

U.S. PATENT DOCUMENTS

| | | | |
|---|---|---|---|
| 1,175,300 A | 3/1916 | Ross | |
| 2,191,763 A | 2/1940 | La Casse | |
| 2,481,066 A | 9/1949 | Bagge | |
| 3,173,309 A | 3/1965 | Seliger | |
| 3,310,997 A | 3/1967 | Biddle | |
| 3,447,396 A * | 6/1969 | Seliger | 74/650 |
| 3,472,349 A | 10/1969 | Ainsworth | |
| 3,581,597 A | 6/1971 | Reiersgaard | |
| 3,700,082 A | 10/1972 | Schwab | |
| 3,935,753 A | 2/1976 | Williams | |
| 4,373,407 A | 2/1983 | Okubo | |
| 4,434,878 A | 3/1984 | Okubo | |
| 4,876,918 A | 10/1989 | Hudson | |
| 5,971,123 A | 10/1999 | Ochab et al. | |
| 6,516,688 B2 * | 2/2003 | Albertson | 81/59.1 |
| 6,629,590 B2 | 10/2003 | Ochab et al. | |
| 6,655,515 B2 * | 12/2003 | Cox et al. | 192/38 |
| 6,722,484 B2 | 4/2004 | Ochab et al. | |
| 2003/0089570 A1 | 5/2003 | Ochab et al. | |

OTHER PUBLICATIONS

European Search Report for European Application No. EP 06 25 1647, dated Jun. 30, 2006.

\* cited by examiner

*Primary Examiner*—Richard M Lorence
(74) *Attorney, Agent, or Firm*—Sterne Kessler Goldstein & Fox P.L.L.C.

(57) ABSTRACT

A bi-directional overrunning clutch comprising an input gear, a pair of hubs, and a roller assembly is provided. Each hub is engaged to an end of one of a pair of shaft segments of a primary drive axle. The roller assembly is disposed within the input gear and about at least a portion of each hub. The roller assembly includes spring pins, extending from the roller assembly, with ball locks adapted to engage detents on the surface of each hub, so as to form spring pin engagements between the roller assembly and the hubs. In operation, rotation of the input gear causes rotation of the roller assembly. Thereafter, rotation of the roller assembly causes rotation of the hubs via the spring pin engagements. The spring pins, however, are generally adapted to disengage the spring pin engagements when one of the hubs rotates faster than the other hub.

21 Claims, 8 Drawing Sheets

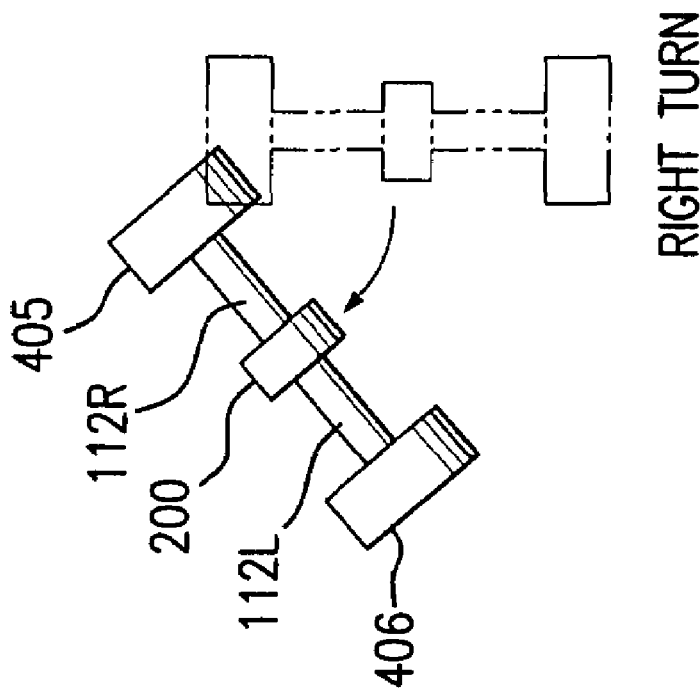
FIG.4B RIGHT TURN
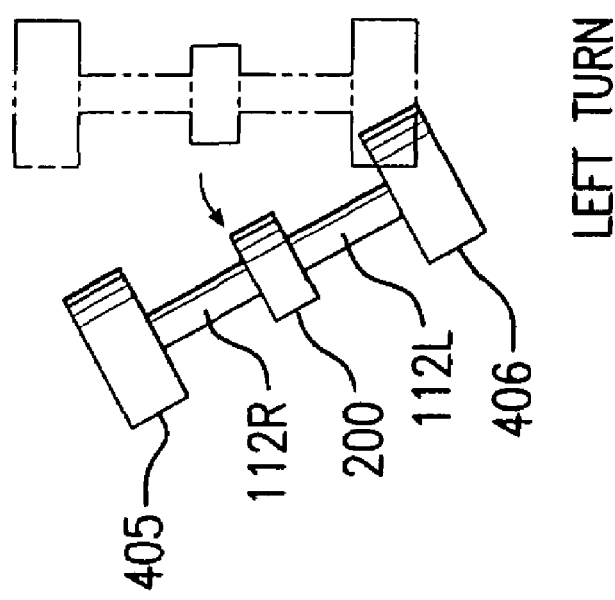
FIG.4A LEFT TURN

AUTOMATIC TRACTION ENHANCEMENT FOR TRANSAXLE

BACKGROUND OF THE INVENTION

1. Field of the Invention

The present invention is related to clutches, and more particularly to a bi-directional overrunning clutch for controlling torque transmission to a primary drive axle of a working vehicle.

2. Background Art

Simple drive systems for two wheel drive working vehicles, i.e. lawn mowers, lawn vacuums, snow blowers, utility tractors, trimmers, edgers, concrete and asphalt cutters, and the like, typically include a drive shaft or belt connected to a single drive axle, which drives both drive wheels. The principal deficiency with this type of drive system is that the vehicle is inefficient during turning because the wheels rotate on a common shaft, and thus rotate at the same rate of speed.

For instance, when turning such a vehicle, the outer wheel must travel a greater distance than the inner wheel in the same amount of time. However, because the wheels rotate on a common shaft, the result is that differential rotation is not permitted, resulting in one of the wheels slipping or skidding. This slipping/skidding results in premature wear of the wheel, and damage to surfaces on which the vehicle is operating. A lawn mower with this type of drive system can damage the turf under the slipping wheel.

To eliminate this inefficiency, common drive systems for wheeled working vehicles generally provide a differential between the pair of drive wheels. The differential permits independent or differential rotation of the drive wheels on an axle when the vehicle turns. Differentials, however, have various disadvantages. For example, when one wheel losses traction with the ground, the conventional differential is unable to transmit torque to the opposite wheel. To address this problem, many differentials on the market today use some form of overrunning clutch, or differential lock, to transmit torque when needed to a driven shaft. One use of an overrunning clutch in an all terrain vehicle is disclosed in U.S. Pat. No. 5,036,939. In that patent, the vehicle incorporates overrunning clutches where the wheel hub mounts to the axle, thus allowing each wheel to independently disengage when required. Another use of an overrunning clutch in a differential is disclosed in U.S. Pat. No. 5,971,123, which describes an electromechanical, bi-directional overrunning clutch differential that addresses many of the problems inherent in the prior drive systems.

Another bi-directional overrunning clutch is described in U.S. Pat. No. 6,722,484, which is hereby incorporated in its entirety by reference thereto. A disadvantage of the system described in U.S. Pat. No. 6,722,484 is that its life and reliability depends solely on the durability of an O-ring, which typically has a short lifespan. Excess wear on the O-ring will cause such a system to fail, which can lead to expensive repair or system replacement, and possibly vehicle failure.

Conventional differentials and overrunning clutches are generally costly to manufacture and are thus relegated to more expensive vehicles, such as cars and four-wheel drive vehicles. The need exists for a less complex, less expensive bi-directional overrunning clutch that can be used in various self-propelled machines and light duty vehicles, such as snow blowers, lawn mowers, garden tractors, golf carts, utility tractors, concrete and asphalt cutters, and the like.

SUMMARY OF THE INVENTION

There is provided a bi-directional overrunning clutch comprising an input gear, an inner cam surface within the input gear, a pair of hubs, and a roller assembly. Each hub is adapted to engage an end of one of a pair of shaft segments of a primary drive axle. The roller assembly is disposed within the input gear and is adjacent to the inner cam surface. The roller assembly includes a plurality of rollers and at least one roll cage having a plurality of recesses, each roller being located within one of the recesses, and the roll cage being disposed about at least a portion of each hub. The roller assembly also includes at least one spring pin extending from the roll cage and having a ball lock adapted to engage with a detent on a surface of one of the hubs, so as to form at least one spring pin engagement between the roller assembly and one of the hubs. The inner cam surface is adapted to provide a wedging engagement with the rollers of the roller assembly when the input gear is rotated. As such, rotation of the input gear causes rotation of the roller assembly via the wedging engagement. Thereafter, rotation of the roller assembly causes rotation of at least one hub via the spring pin engagement between the ball lock and the detent on the surface of the hub. The spring pin is generally adapted to disengage the spring pin engagement when one of the hubs rotates faster than the rotation of the roller assembly, or when one of the hubs rotates faster than the other hub.

BRIEF DESCRIPTION OF THE DRAWINGS/FIGURES

The accompanying drawings, which are incorporated herein and form part of the specification, illustrate a bi-directional overrunning clutch and, together with the description, further serve to describe and enable a person skilled in the relevant art to make and use such a bi-directional overrunning clutch.

FIG. 4A is a schematic view of a drive axle making a left turn.

FIG. 4B is a schematic view of a drive axle making a right turn.

DETAILED DESCRIPTION OF THE INVENTION

Embodiments of a bi-directional overrunning clutch are now described with reference to the figures, where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the appended claims. It will be apparent to a person skilled in the relevant art that the bi-directional overrunning clutch may also be employed in a variety of other applications.

Figure 1:
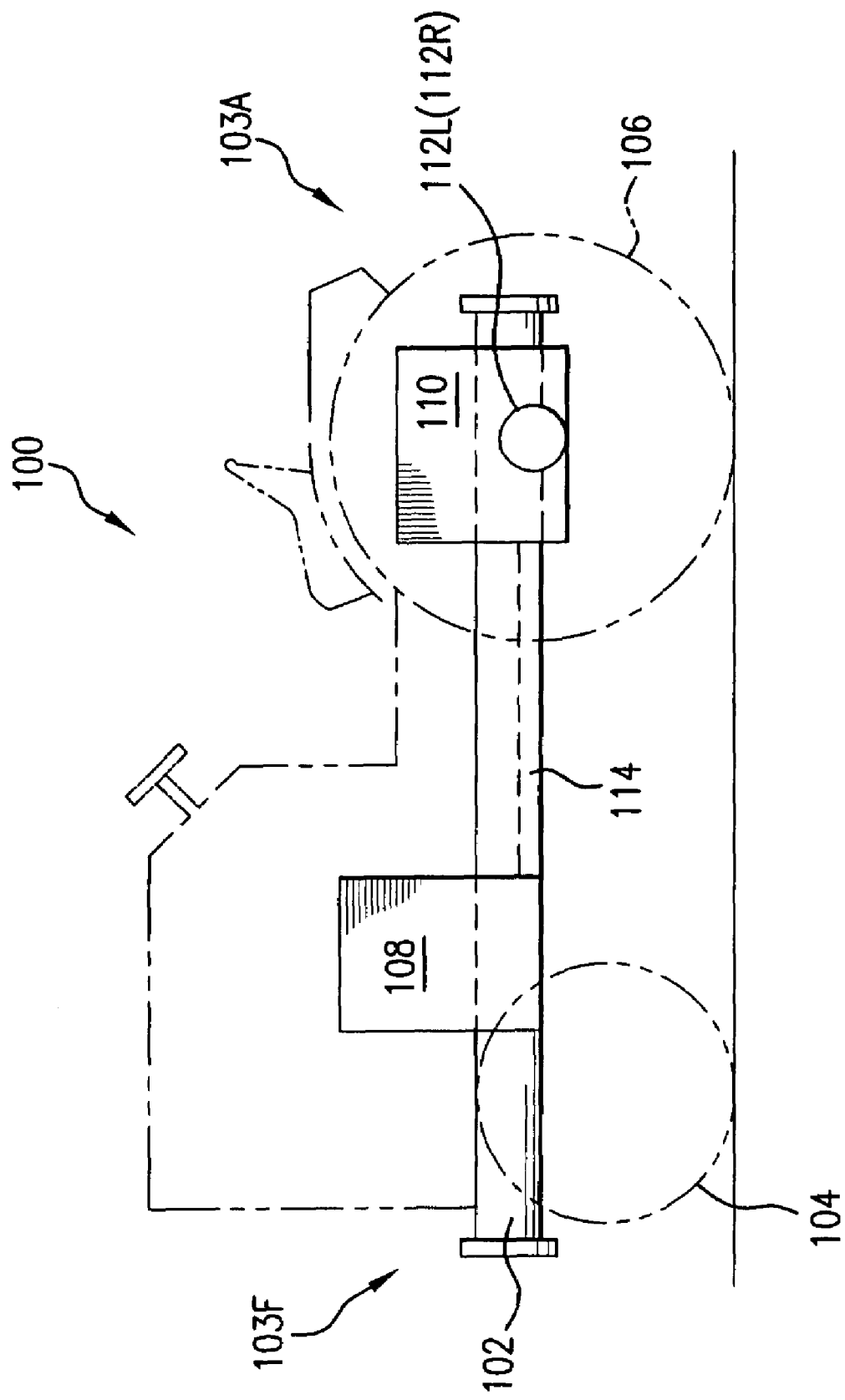
FIG. 1 is a side view of a working vehicle incorporating a bi-directional overrunning clutch.

FIG. 1 illustrates a working vehicle 100, such as a lawn or garden tractor. Working vehicle 100 includes a frame 102, which extends from front end 103F to rear end 103R of vehicle 100. A front pair of wheels 104 and a rear pair of wheels 106 are mounted on frame 102. Working vehicle 100 has an engine 108 mounted near the front end of frame 102. A person skilled in the art would understand that engine 108 can be mounted anywhere on frame 102 (front, middle, or rear). As shown, a transmission 110 is disposed at the rear of frame 102 of working vehicle 100. A drive train 114 transmits power from engine 108, and serves as an input shaft into transmission 110, ultimately transmitting rotary power to rear axle shaft segments 112L, 112R. Transmission 110 can be any type of transmission known to the art; for example, an integrated hydrostatic transmission (IHT) or a standard mechanical transmission. An exemplary IHT is described in U.S. Pat. No. 6,619,038, the disclosure of which is hereby incorporated in its entirety by reference. An exemplary mechanical transmission is described in U.S. Pat. No. 6,098,386, the disclosure of which is hereby incorporated in its entirety by reference. Further, transmission 110 could alternatively be mounted on the front of frame 102 if the vehicle is a front wheel drive vehicle.

Figure 2:
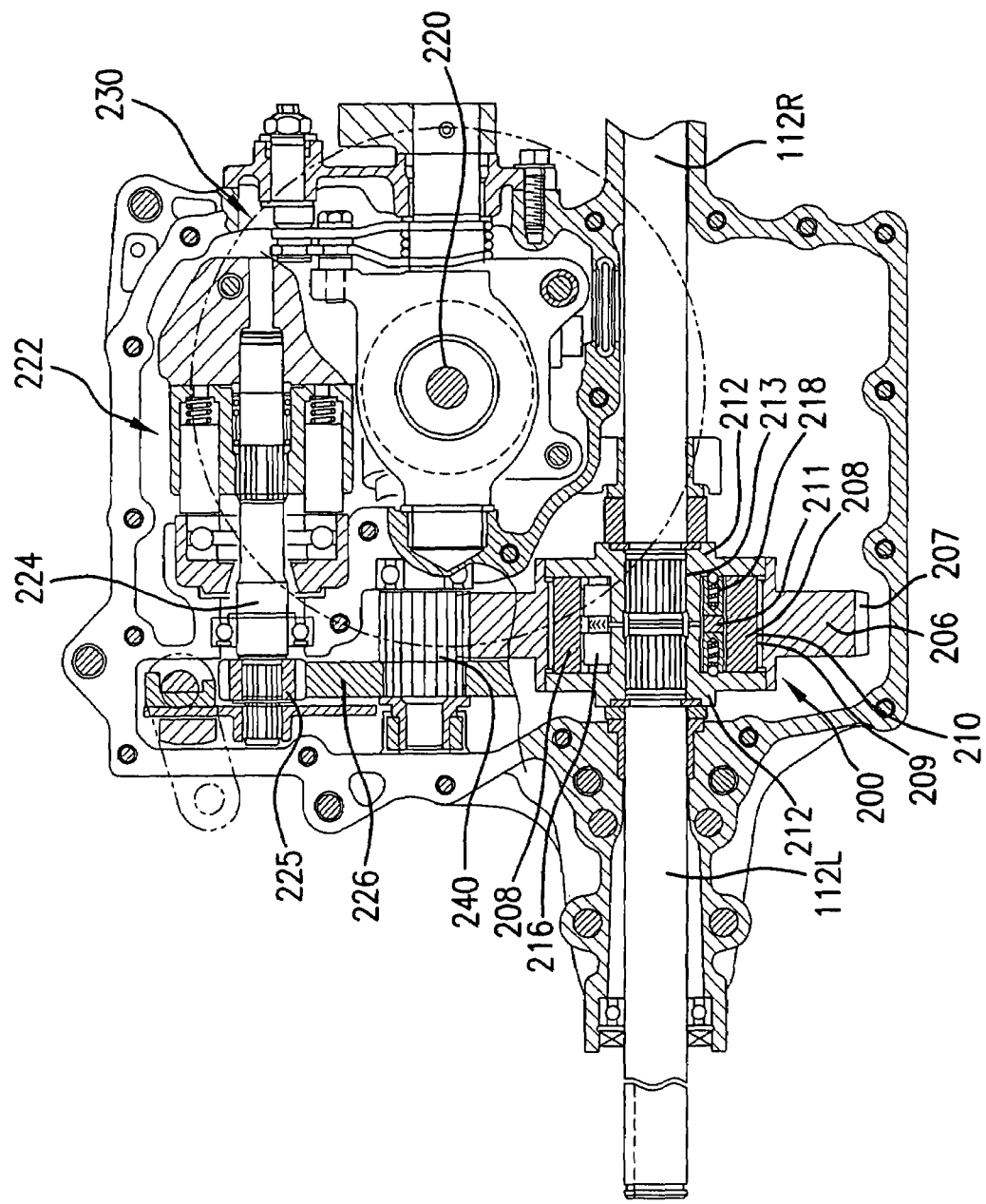
FIG. 2 is a plan view of the bi-directional overrunning clutch.

FIG. 2 is a plan view of a bi-directional overrunning clutch 200 incorporated in an IHT. Bi-directional overrunning clutch 200 is disposed between left and right shaft segments 112L, 112R. Left and right rear wheels 106 are attached to left and right shaft segments 112L, 112R, respectively. In operation, rotation of bi-directional overrunning clutch 200 transmits rotary motion to left and right shaft segments 112L, 112R, and thus to left and right rear wheels 106.

Bi-directional overrunning clutch 200, includes an input gear 206. Input gear 206, has gear teeth 207 along its outer periphery. Gear teeth 207 are adapted to mate with an input pinion gear 240, such that rotation of input pinion gear 240 (as discussed below) transmits rotary motion to input gear 206. Input gear 206 can be formed of a single piece of cast metal, or any other suitable materials known in the art. Input gear 206 may alternatively be formed of more than one material.

Disposed within input gear 206, is a cam gear 208. Disposed along the inner portion of input gear 206 are gear teeth 209. Gear teeth 209 mate with gear teeth 210, disposed along the outer surface of cam gear 208, as more clearly shown in FIG. 3, such that rotation of input gear 206 transmits rotary motion to cam gear 208. In an alternative embodiment, input gear 206 and cam gear 208 may be formed of one integral piece.

Disposed within cam gear 208 is a roller assembly 211. Roller assembly 211 includes rollers 216 and spring pins 218. Roller assembly 211, rollers 216, and spring pins 218 will be discussed in more detail below with relation to FIG. 3. Disposed within roller assembly 211 are a pair of hubs 212. Hubs 212 are engaged with left and right shaft segments 112L, 112R, respectively, through splined engagements 213. Thus, rotation of hubs 212 transmits rotary motion to left and right shaft segments 112L, 112R.

As shown in FIG. 2, bi-directional overrunning clutch 200 is incorporated in an IHT. As such, rotary motion is transmitted from engine 108, through drive train 114, and into the IHT through IHT input shaft 220. IHT input shaft 220 transmits rotary motion to a hydraulic pump 230 (shown in phantom), which in turn is fluidly connected to hydraulic motor 222. Hydraulic motor 222, hydraulically driven by the hydraulic pump, rotates a hydraulic motor output shaft 224, which rotates a pair of pinion gears 225, 226, which ultimately rotate input pinion gear 240. As such, the pinion gears serve as an output drive train to transmit rotary power between the IHT and the bi-directional overrunning clutch 200. As discussed above, rotation of input pinion gear 240 rotates input gear 206 of bi-directional overrunning clutch 200 to ultimately provide drive power for left and right shaft segments 112L, 112R.

Figure 3:
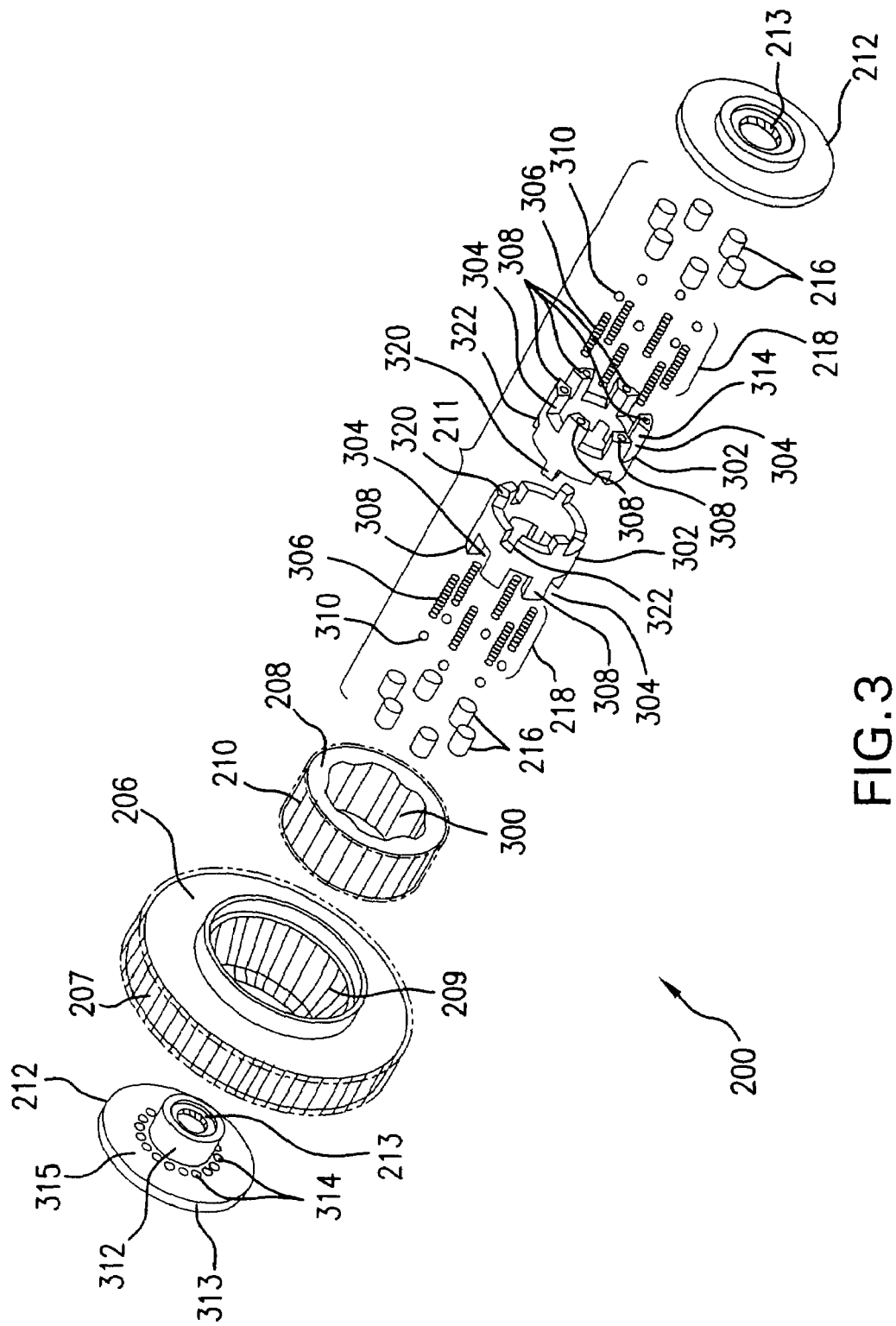
FIG. 3 is an exploded view of the bi-directional overrunning clutch.

FIG. 3 shows an exploded view of bi-directional overrunning clutch 200. As shown, input gear 206 has gear teeth 207 around its outer periphery. Input gear 206 further includes gear teeth 209 along its inner portion. Gear teeth 209 are fitted to mate with gear teeth 210 on the outer surface of cam gear 208. Thus, rotation of input gear 206 transmits rotational motion to cam gear 208.

Cam gear 208 includes an inner cam surface 300. Inner cam surface 300 is adapted to form a wedging engagement with roller assembly 211, when roller assembly 211 is disposed within cam gear 208. As such, rotation of input gear 206 rotates cam gear 208 and in turn locks roller assembly 211 into a wedging engagement with inner cam surface 300, and thus transmits rotary motion from input gear 206 to roller assembly 211.

Roller assembly 211 is comprised of a pair of roll cages 302 having a plurality of recesses 304. One of a plurality of rollers 216 is aligned and held within each recess 304. In operation, the interaction between rollers 216 and inner cam surface 300 produces the wedging engagement described above. Each roll cage 302 also includes a plurality of extensions 320 designed to fit within corresponding recesses 322 in the other roll cage 302. Preferably, extensions 320 loosely fit within recesses 322 to form a loose fitting interlock between the two roll cages 302; with, for example, three degrees of play between the two roll cages 302. In an alternative embodiment, the pair of roll cages 302 may be replaced with one integral roll cage.

Roller assembly 211 also includes a plurality of spring pins 218, which are comprised of a spring 306 and a ball lock member 310. As shown, a spring pin 218 is disposed within one, or more, of the openings 308 in the roll cages 302. In an alternative embodiment, spring pins 216 can be adhered to the surface of roll cage 302 and thereby adapted to extend in a direction coaxial with roller assembly 211. Alternatively, spring pins 218 can be adapted to transect through the entirety of roller assembly 211. Ball lock members 310 are adapted to engage with detents 314 along an inner surface 315 of each hub 212.

When properly assembled, hubs 212 are aligned coaxially with input gear 206 and are located within at least a portion of roller assembly 211. Each hub 212 is generally one integral unit having a base portion 312 and a cover portion 313. In an alternative embodiment, each hub 212 may be comprised of two individual pieces, for example a base and a cover, which are attached by conventional attachment means. When bi-directional overrunning clutch 200 is assembled, base portion 312 is in direct contact with rollers 216, and cover portion 313 covers at least the cam surface 300 of cam gear 208.

Each hub 212 includes a splined portion 213, which is adapted to engage with the ends of left and right shaft segments 112L, 112R. As such, rotation of each hub 212 transfers rotary motion to the respective shaft segment.

The inner surfaces 315 of cover portions 313 of hubs 212 include a plurality of detents 314. Each detent 314 is adapted to engage with a ball lock member 310 of a spring pin 218. In operation, the plurality of detents 314 form a plurality of spring pin engagements with ball lock members 310 of spring pins 218. As such, rotation of roller assembly 211 rotates hubs 212 through the engagement of spring pins 218. Spring pins 218, however, are adapted to disengage the spring pin engagements if one hub 212 rotates faster than roller assembly 211, or rotates faster than the opposite hub 212. Such an arrangement provides a system for differential rotation of two axles, without depending on the durability of an O-ring, as does the system of U.S. Pat. No. 6,722,484.

For example, when working vehicle 100 is making a left turn, as shown in FIG. 4A, right wheel 405 is forced to turn faster than left wheel 406 because right wheel 405 must cover a greater distance than left wheel 406 in the same amount of time. As such, the quicker rotation of right wheel 405 will result in quicker rotation of right hub 212, than of left hub 212. Spring pins 218, engaged with right hub 212, will disengage with right hub 212, to thereby allow right hub 212 to rotate freely relative to left hub 212. Torque, however, is still transmitted through bi-directional overrunning clutch 200 to left wheel 406 through the spring pin engagements with left hub 212.

When working vehicle 100 is making a right turn, as shown in FIG. 4B, left wheel 406 is forced to turn faster than right wheel 405 because left wheel 406 must cover a greater distance than right wheel 405 in the same amount of time. As such, the quicker rotation of left wheel 406 will result in quicker rotation of left hub 212, than of right hub 212. The spring pins 218, engaged with left hub 212, will disengage with left hub 212, to thereby allow left hub 212 to rotate freely relative to right hub 212. Torque, however, is still transmitted through bi-directional overrunning clutch 200 to right wheel 405 through the spring pin engagements with right hub 212.

Figure 5:
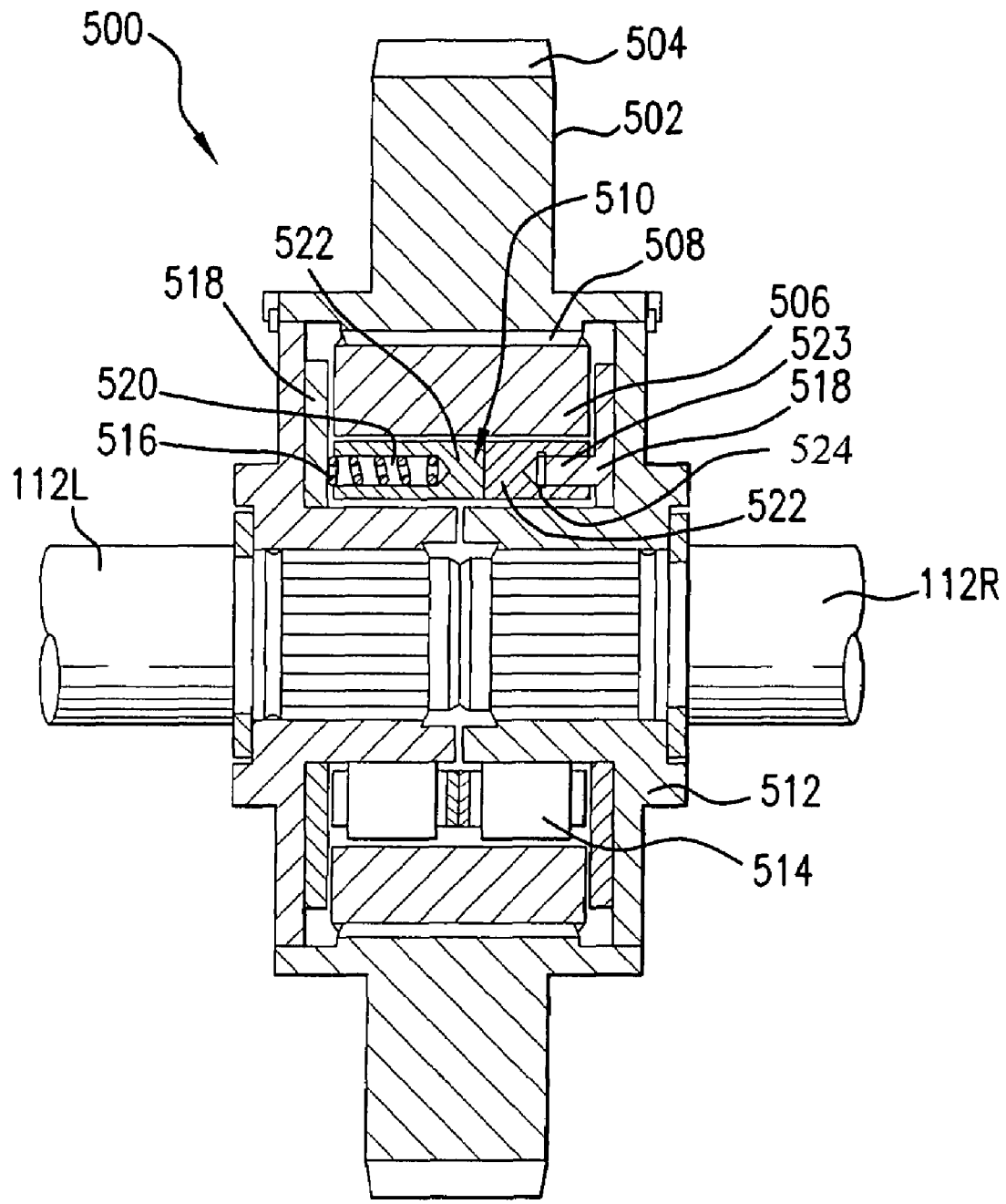
FIG. 5 is a sectional view of a bi-directional overrunning clutch in accordance with an alternative embodiment.

FIG. 5 is a sectional view of a bi-directional overrunning clutch 500 in accordance with an alternative embodiment of the invention. Similar to bi-directional overrunning clutch 200, clutch 500 includes an input gear 502, having gear teeth 504 along its periphery, a cam gear 506, disposed within input gear 502 and mated through gear teeth engagement 508, and a roller assembly 510. Hubs 512 are disposed within roller assembly 510 and mated with left and right shaft segments 112L, 112R. Rollers 514 are included to form a wedging engagement between roller assembly 510 and cam gear 506.

Roller assembly 510 differs from roller assembly 211 in that roller assembly 510 includes springs 516 and friction members 518. Springs 516 are located within recesses 520 in roll cage 522. Friction members 518 include protrusions 523, which extend into recesses 524 in roll cage 522. Each roll cage 522 includes a plurality of alternating recesses 520 and 524, along the circumference of roll cage 522, for receiving springs 516 and friction member protrusions 523, respectively.

In operation, springs 516 push against friction member 518, which in turn pushes against hub 512. The spring force of spring 516 also exerts a force in the opposite direction, thus pushing roll cage 522 against the opposite friction member 518 and hub 512. As such, rotation of the roller assembly 510 will transmit rotary motion to hubs 512 through the frictional forces between the friction members 518 on either side of roll cages 522. However, when one shaft segment must rotate faster than the roller assembly 510, or faster than the opposite shaft segment, as described above, the frictional force between the hubs 512 and the friction members 518 will be overcome, and one hub 512 will be allowed to freely rotate faster than the roller assembly 510.

Figure 6:
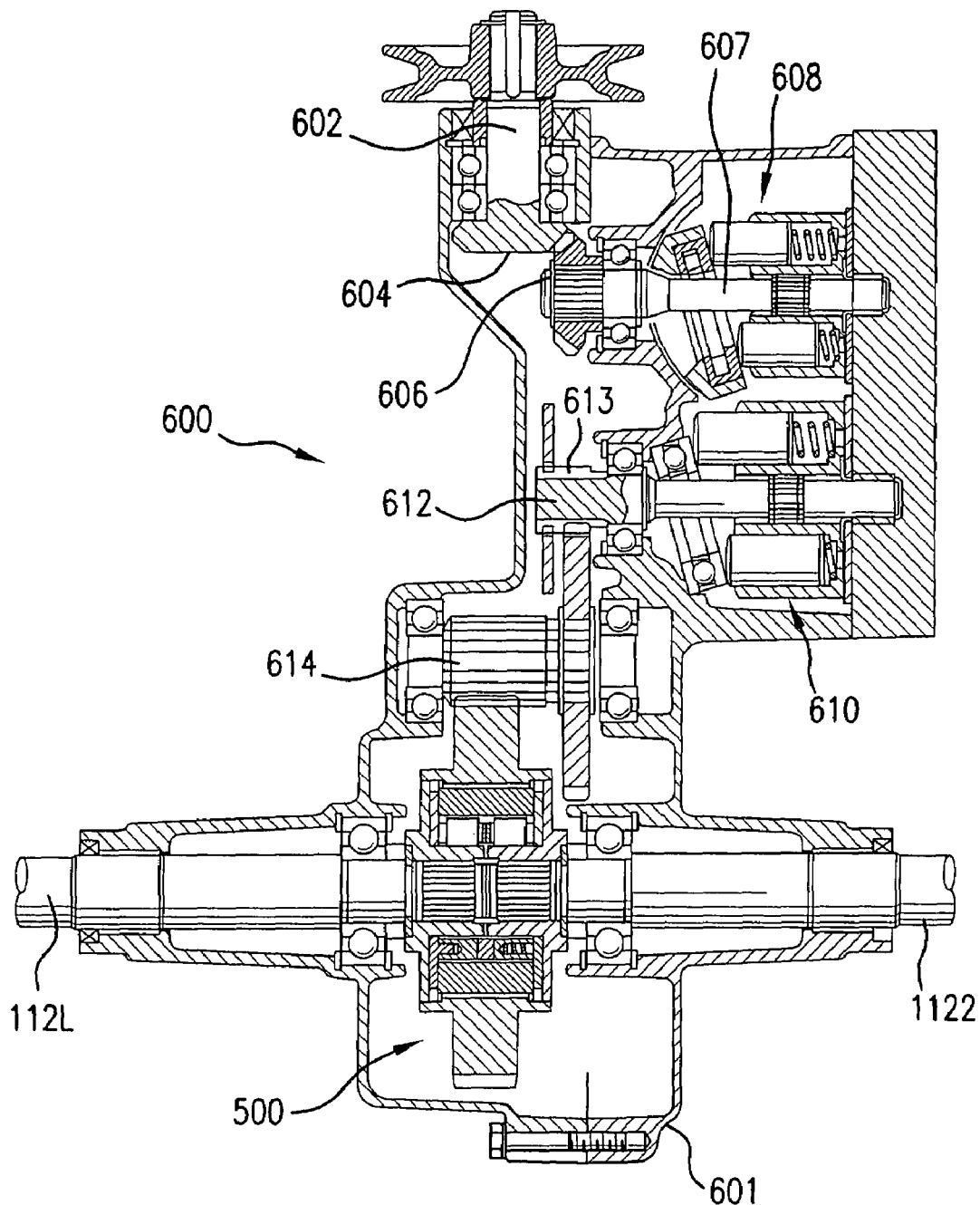
FIG. 6 is a sectional view of the bi-directional overrunning clutch of FIG. 5, incorporated into an integrated hydrostatic transmission.

FIG. 6 is a vertical sectional view of bi-directional overrunning clutch 500, incorporated into an IHT 600. IHT input shaft 602 receives rotary motion from engine 108. Through bevel gears 604 and 606, serving as an input drive train, rotary motion is transmitted to the pump input shaft 607 of hydraulic pump 608. As is known in the art, hydraulic pump 608 is in fluid communication with hydraulic motor 610, to thereby drive hydraulic motor 610. Hydraulic motor 610 then rotates hydraulic motor output shaft 612, which rotates gears 613, ultimately rotating input pinion 614. As described above, rotations of input pinion transmits rotary motion to bi-directional overrunning clutch 500, which ultimately drives rotation of left and right shaft segments 112L, 112R.

Figure 7:
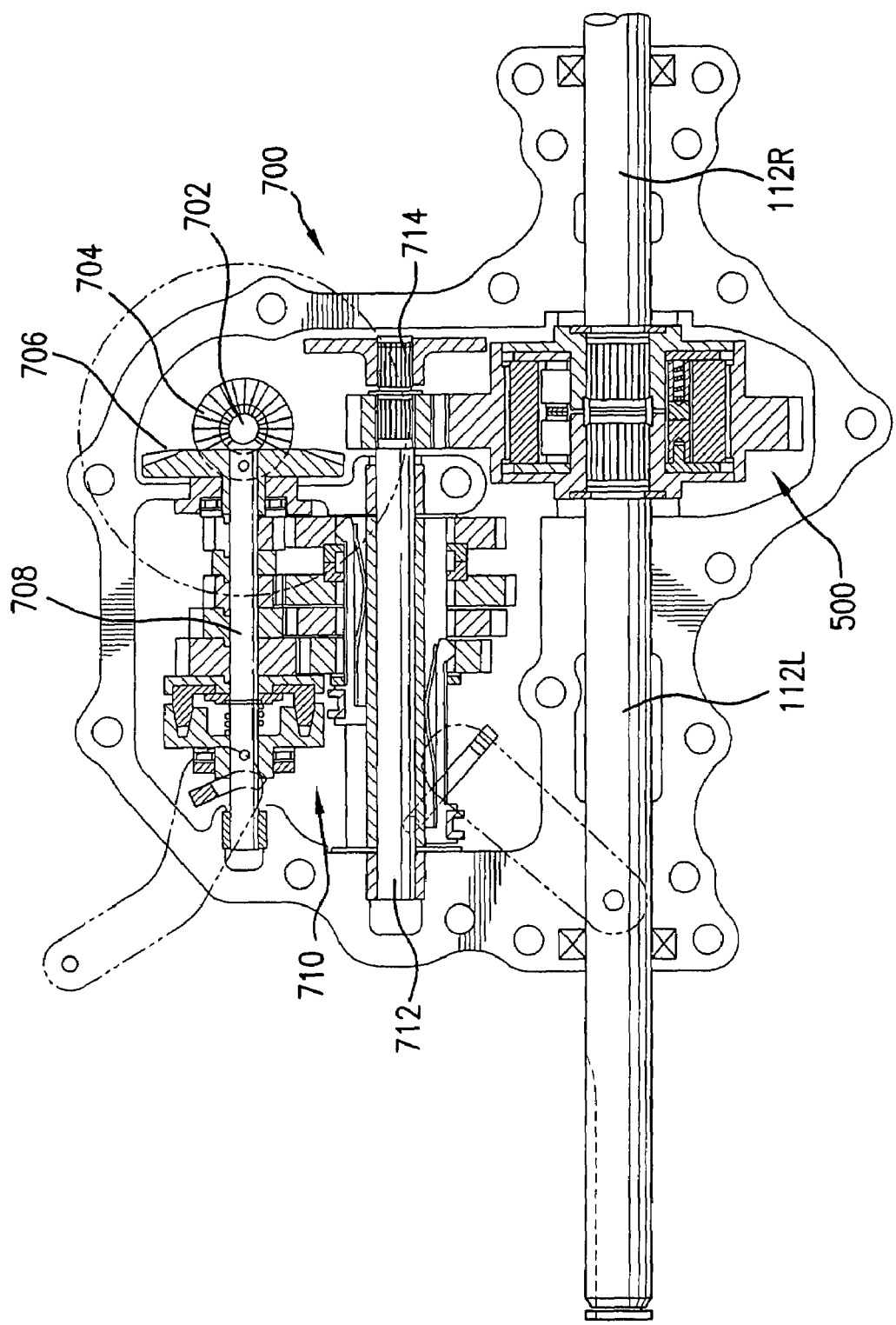
FIG. 7 is a plan view of the bi-directional overrunning clutch of FIG. 5, incorporated into a standard mechanical transmission.

FIG. 7 is a plan view of bi-directional overrunning clutch 500, incorporated into a mechanical transmission 700. Mechanical transmission 700 is driven by input shaft 702, which in turn is driven by engine 108. Input shaft 702 turns bevel gear 704, which rotates bevel gear 706. Rotation of sun gear 706 causes rotation of an intermediate shaft 708. Through the clutch arrangement 710, an output shaft 712 is driven. Clutch arrangement 710 is described in more detail in U.S. Pat. No. 6,098,386. Output shaft 712 rotates input pinion 714, which transmits rotary motion to bi-directional overrunning clutch 500, ultimately driving left and right shaft segments 112L, 112R.

Figure 8:
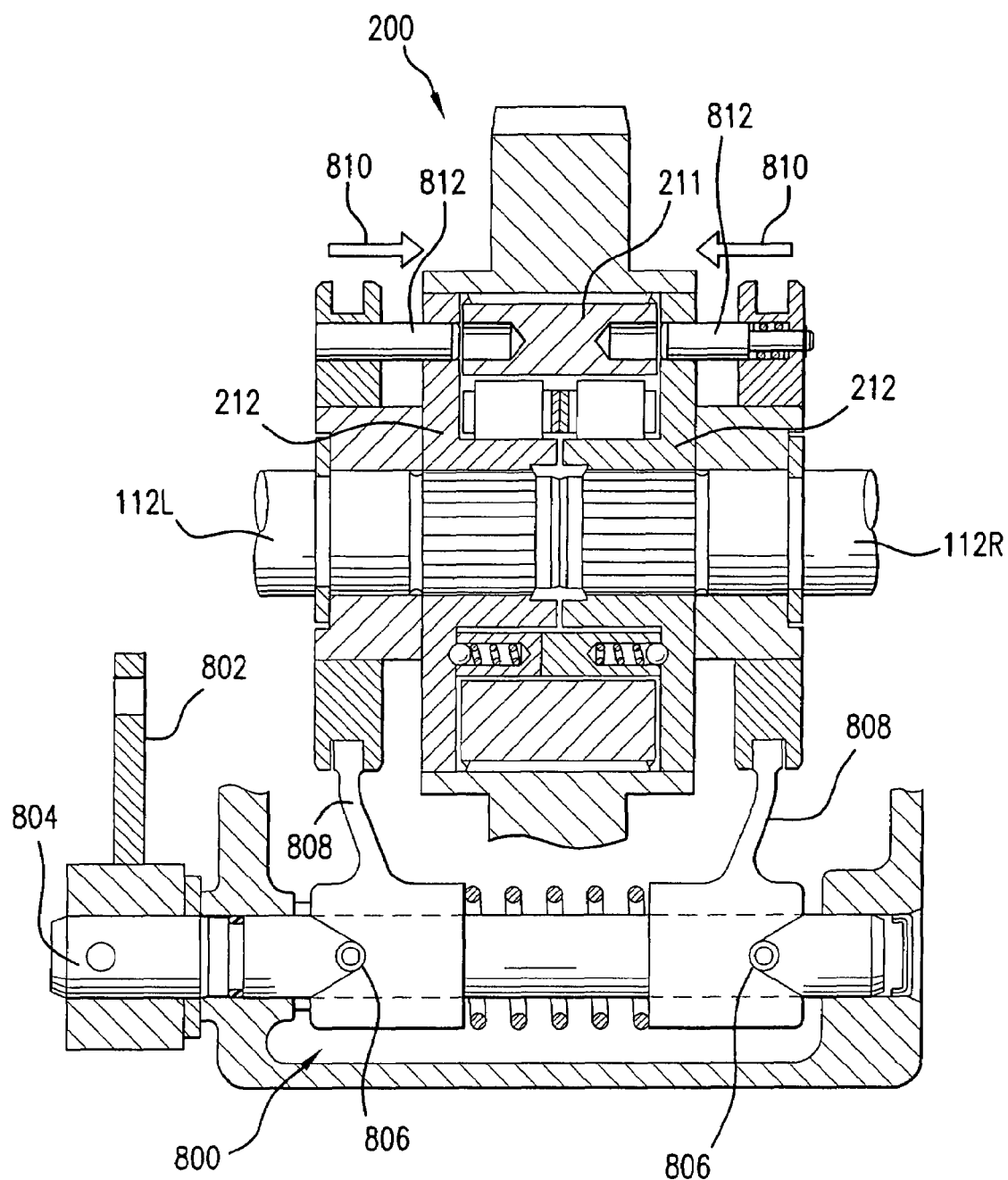
FIG. 8 is a sectional view of the bi-directional overrunning clutch of FIG. 5, incorporated in a differential lock mechanism.

FIG. 8 is a sectional view of bi-directional overrunning clutch 200, incorporated in a differential lock mechanism 800. As shown, a differential lock lever 802 may be utilized to rotate cam shaft 804. Cam shaft 804 has a pair of cam engagements 806 with forks 808. Rotation of cam shaft 804 causes thrust forces 810 which push lock members 812 into the roller assembly 211. When lock members 812 are locked into roller assembly 211, the hubs 212 are interlocked with roller assembly 211, and differential rotation between left and right shaft segments 112L, 112R is not permitted.

While various embodiments of a bi-directional overrunning clutch have been described above, it should be understood that they have been presented by way of example and not limitation. Thus the present invention should not be limited by any of the above described exemplary embodiments, but should be defined only in accordance with the following claims and their equivalents. All cited patent documents and publications in the above description are incorporated in their entirety herein by reference.

What is claimed is:

1. A bi-directional overrunning clutch, comprising:
an input gear;
a cam gear, disposed within the input gear, having an inner cam surface;
a pair of hubs, each adapted to engage an end of one of a pair of shaft segments of a primary drive axle for rotation therewith;
a roller assembly disposed within the cam gear, the roller assembly including
a plurality of rollers arranged in two sets of rollers,
a roll cage having a plurality of recesses, each roller being located within one of the recesses, the roll cage being located about at least a portion of each hub so as to position each set of rollers about at least a portion of one of the hubs, and
a spring pin extending from the roll cage and having a ball lock adapted to engage with a detent on a surface of one of the hubs so as to form a spring pin engagement between the roller assembly and the hub; and wherein the inner cam surface is adapted to provide a wedging engagement with the rollers of the roller assembly when the input gear is rotated in a first direction relative to the roller assembly such that rotation of the input gear causes rotation of the roller assembly via the wedging engagement, and rotation of the roller assembly causes rotation of the hub via the spring pin engagement between the ball lock and the detent on the surface of the hub, and wherein the spring pin is adapted to disengage the spring pin engagement when the hub rotates faster than the rotation of the roller assembly.

2. The bi-directional overrunning clutch defined in claim 1, further comprising a plurality of spring pins extending from the roll cage, each spring pin including a ball lock adapted to engage with one of a plurality of detents along the surface of one of the hubs so as to form a plurality of spring pin engagements.

3. The bi-directional overrunning clutch defined in claim 1, further comprising a friction member disposed between the roller assembly and one of the hubs.

4. The bi-directional overrunning clutch defined in claim 3, wherein the spring pin is adapted to disengage one of the spring pin engagements when one of the hubs rotates faster relative to the other hub.

5. The bi-directional overrunning clutch defined in claim 1, wherein the roller assembly includes two loosely interlocked roll cages.

6. The bi-directional overrunning clutch defined in claim 1, wherein each hub includes a base portion and a cover portion, wherein the base portion and the cover portion are integral with each other.

7. A bi-directional overrunning clutch comprising:
a gear;
a roller assembly, disposed within the gear, including
a roll cage having a recess,
a roller located within the recess, and
a spring pin extending from the roll cage and having a ball lock; and
a hub, located at least partially within the roller assembly, adapted to engage an end of a shaft segment of a primary drive axle, and having a detent, on a surface of the hub, adapted to receive the ball lock of the spring pin to thereby form a spring pin engagement, and wherein the spring pin is adapted to disengage the spring pin engagement when the hub rotates faster than the rotation of the roller assembly.

8. The bi-directional overrunning clutch defined in claim 7, further comprising a plurality of spring pins extending from the roll cage, each spring pin including a ball lock adapted to engage with one of a plurality of detents along the surface of the hub so as to form a plurality of spring pin engagements.

9. The bi-directional overrunning clutch defined in claim 7, further comprising a friction member disposed between the roller assembly and the hub.

10. The bi-directional overrunning clutch defined in claim 7, wherein the gear has an inner cam surface and the inner cam surface is adapted to form a wedging engagement with the roller assembly.

11. A transaxle on a primary drive axle of a wheeled machine comprising:
a transaxle housing;
an input shaft extending into the housing;
a transmission coupled to the input shaft through an input drive train so as to be driven by the rotary motion of the input shaft; and
a bi-directional overrunning clutch, disposed within the housing, coupled to the transmission through an output drive train, and comprising
an input gear having gear teeth mated with the output drive train,
a roller assembly disposed within the input gear, the roller assembly including
a plurality of rollers arranged in two sets of rollers,
a roll cage having a plurality of recesses, each roller being located within one of the recesses, and
a plurality of spring pins extending from the roll cage,
a pair of hubs, each disposed at least partially within the roller assembly, each adapted to engage an end of one of a pair of shaft segments of a primary drive axle for rotation therewith, and each having a plurality of detents along a surface of each hub; and
wherein each spring pin has a ball lock adapted to engage with the detents on the surfaces of the hubs so as to form a plurality of spring pin engagements between the roller assembly and the hubs, and wherein the ball lock is adapted to disengage the detent when the hub rotates faster than the rotation of the roller assembly.

12. The transaxle of claim 11, wherein the transmission is an integrated hydrostatic transmission including a hydraulic pump and a hydraulic motor.

13. The transaxle of claim 11, wherein the transmission is a clutch transmission.

14. The bi-directional overrunning clutch defined in claim 11, wherein the spring pin is adapted to disengage the ball lock from the detent when the hub rotates faster than the rotation of the roller assembly.

15. The transaxle of claim 11, wherein the transmission is a standard mechanical transmission.

16. A bi-directional overrunning clutch comprising:
a gear;
a roller assembly, disposed within the gear, including
a roll cage having a plurality of recesses disposed therein, and
a spring disposed within at least one of the plurality of recesses in the roll cage;
a hub, located at least partially within the roller assembly, adapted to engage an end of a shaft segment of a primary drive axle; and
an annular friction member disposed between the roller assembly and the hub, wherein the friction member is disposed coaxial with the hub and positioned such that the spring exerts a force on the friction member, thereby creating a frictional force between the friction member and the hub.

17. The bi-directional overrunning clutch of claim 16, further comprising:
a second hub, located at least partially within the roller assembly, adapted to engage an end of a second shaft segment of the primary drive axle; and
a second friction member disposed between the roller assembly and the second hub, wherein the second friction member includes a protrusion extending into one of the plurality of recesses in the roll cage.

18. A transaxle on a primary drive axle of a wheeled machine comprising:
a transaxle housing;
an input shaft extending into the housing;
a transmission coupled to the input shaft through an input drive train so as to be driven by the rotary motion of the input shaft; and a bi-directional overrunning clutch, disposed within the housing, coupled to the transmission through an output drive train, and comprising
an input gear having gear teeth mated with the output drive train;
a roller assembly, disposed within the input gear, including a roll cage having a plurality of recesses disposed therein, and a spring disposed within at least one of the plurality of recesses in the roll cage;
a hub, located at least partially within the roller assembly, adapted to engage an end of a shaft segment of a primary drive axle; and
an annular friction member disposed between the roller assembly and the hub, wherein the friction member is disposed coaxial with the hub and positioned such that the spring exerts a force on the friction member, thereby creating a frictional force between the friction member and the hub.

19. The transaxle of claim 18, wherein the transmission is an integrated hydrostatic transmission including a hydraulic pump and a hydraulic motor.

20. The transaxle of claim 18, wherein the transmission is a clutch transmission.

21. The transaxle of claim 18, wherein the transmission is a standard mechanical transmission.

* * * * *